US012722368B2

(12) United States Patent
Cano et al.

(10) Patent No.: US 12,722,368 B2
(45) **Date of Patent: *Sep. 1, 2026**

(54) METHOD FOR MANUFACTURING AN OPHTHALMIC ELEMENT COMPRISING A FILM STRUCTURE

(71) Applicant: ESSILOR INTERNATIONAL, Charenton-le-Pont (FR)

(72) Inventors: Jean-Paul Cano, Lauzerville (FR); Claudine Biver, Vigoulet Auzil (FR)

(73) Assignee: Essilor International, Charenton-le-Pont (FR)

( * ) Notice: Subject to any disclaimer, the term of this patent is extended or adjusted under 35 U.S.C. 154(b) by 157 days.

This patent is subject to a terminal disclaimer.

(21) Appl. No.: 18/709,742

(22) PCT Filed: Dec. 8, 2022

(86) PCT No.: PCT/EP2022/085061
§ 371 (c)(1),
(2) Date: May 13, 2024

(87) PCT Pub. No.: WO2023/110641
PCT Pub. Date: Jun. 22, 2023

(65) Prior Publication Data

US 2024/0424780 A1 Dec. 26, 2024

(30) Foreign Application Priority Data

Dec. 13, 2021 (EP) .................................... 21306760

(51) Int. Cl.

| | |
|---|---|
| ***B32B 38/00*** | (2006.01) |
| ***B32B 37/18*** | (2006.01) |
| ***G02C 7/08*** | (2006.01) |

(52) U.S. Cl.
CPC ........ *B32B 38/0004* (2013.01); *B32B 37/182* (2013.01); *G02C 7/086* (2013.01); *B32B 2551/00* (2013.01)

(58) Field of Classification Search
None
See application file for complete search history.

(56) References Cited

U.S. PATENT DOCUMENTS

| | | | | |
|---|---|---|---|---|
| 7,581,832 | B2 * | 9/2009 | Begon | B29C 66/81457 351/49 |
| 10,162,195 | B2 | 12/2018 | Marck | |
| 2010/0193112 | A1 | 8/2010 | Bovet et al. | |

FOREIGN PATENT DOCUMENTS

| | | | |
|---|---|---|---|
| EP | 3636423 | A1 | 4/2020 |
| FR | 2918917 | A1 | 1/2009 |
| WO | 2016108062 | A1 | 7/2016 |

OTHER PUBLICATIONS

Alessandra Bonfanti et al., “Elastic stabilisation of wrinkles in thin films by auxetic microstructure”, Cornell University Library, Jul. 21, 2020, 12 pages.

(Continued)

*Primary Examiner* — Barbara J Musser
(74) *Attorney, Agent, or Firm* — NIXON & VANDERHYE

(57) ABSTRACT

A method for manufacturing an ophthalmic element that comprises a vision base element (12) and a film structure (14) adhered to said vision base element allows limiting or suppressing wrinkles and delaminations. This method implements an auxetic part (27) within a sacrificial film portion (26) that belongs initially to the film structure. In this way, stresses generated in a useful area (24) of the film structure by the sacrificial film portion are reduced. The (Continued)

sacrificial film portion is then removed so that only the useful area of the film structure remains in the ophthalmic element.

14 Claims, 4 Drawing Sheets

(56) References Cited

OTHER PUBLICATIONS

International Search Report and Written Opinion of the ISA for PCT/EP2022/085061 dated Feb. 22, 2023, 12 pages.

* cited by examiner

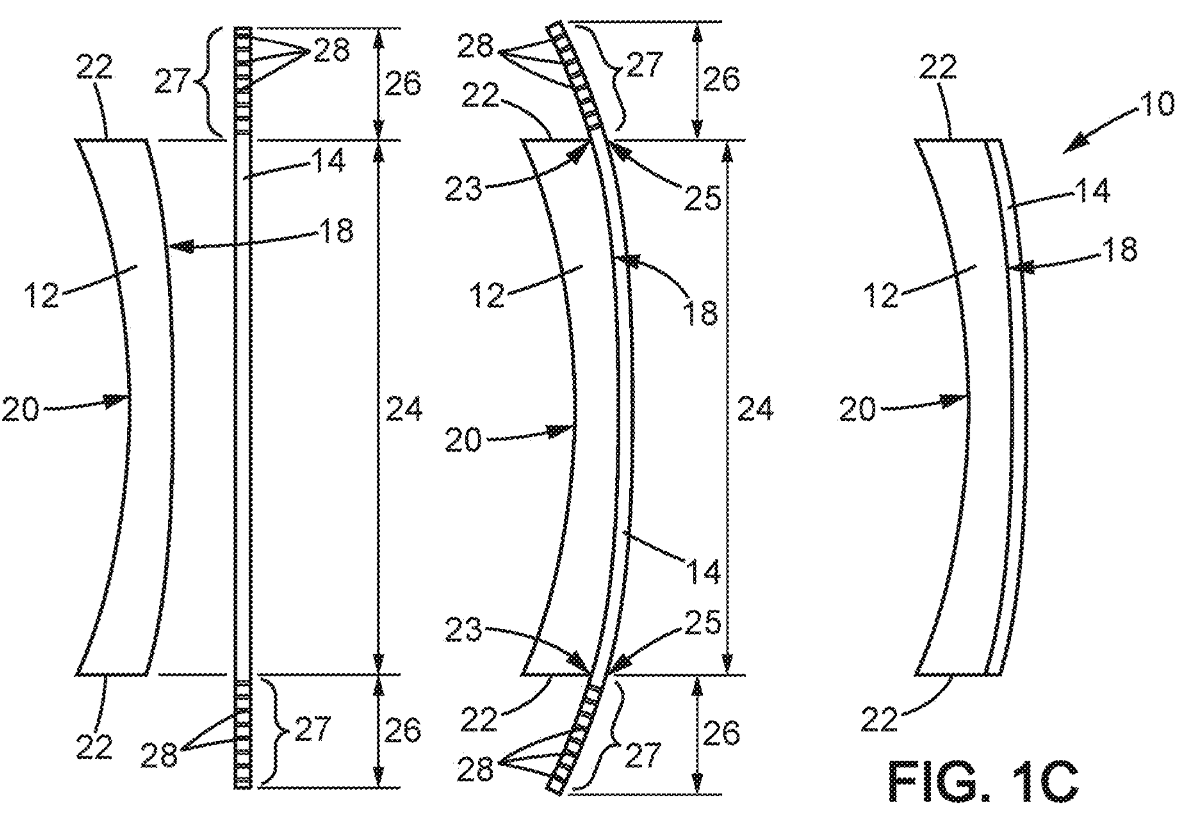
FIG. 1A
FIG. 1B
FIG. 1C
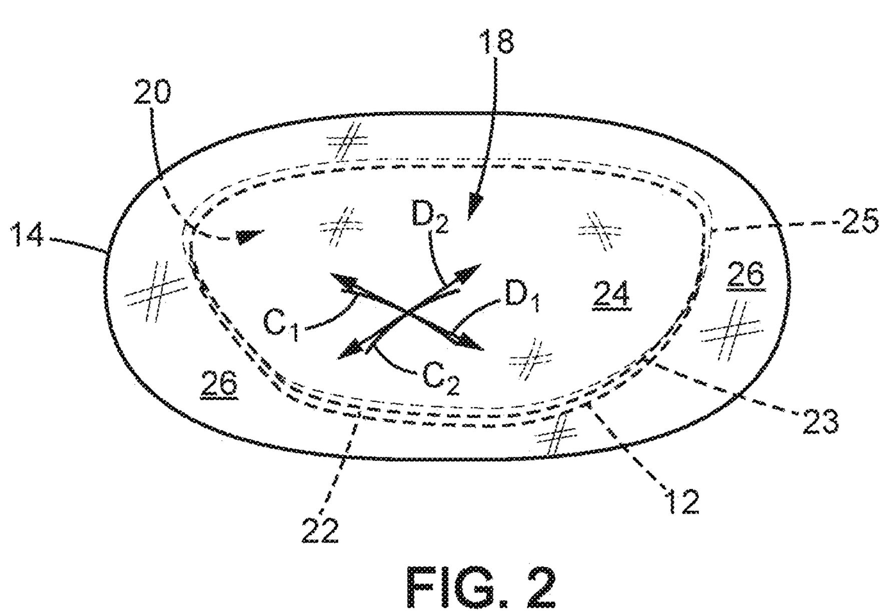
FIG. 2

METHOD FOR MANUFACTURING AN OPHTHALMIC ELEMENT COMPRISING A FILM STRUCTURE

CROSS-REFERENCE TO RELATED APPLICATIONS

This application is the U.S. national phase of International Application No. PCT/EP2022/085061 filed Dec. 8, 2022 which designated the U.S. and claims priority to EP patent application Ser. No. 21/306,760.6 filed Dec. 13, 2021, the entire contents of each of which are hereby incorporated by reference.

The present invention relates to a method for manufacturing an ophthalmic element comprising a film structure.

BACKGROUND OF THE INVENTION

It is known to produce an ophthalmic element comprising a vision base element and a film structure that is adhered to at least one face of this vision base element. To ensure that the ophthalmic element so-obtained allows vision to a wearer of this ophthalmic element, the film structure is at least partially optically transparent.

The vision base element generally has a non-planar optical surface that can be classified according to two principal curvature values along two perpendicular directions for any point in this optical surface. Where one of the curvature values equals zero, corresponding to the case of ruled surfaces, like a portion of a cylindrical or conical fold as particular examples, the optical surface of the vision base element is said to be monoclastic. Where none of the curvature values equals zero but both have same sign, the optical surface of the vision base element is said to be synclastic. Where both curvature values are non-zero and have opposite signs, the optical surface of the vision base element is said to be anticlastic. Using the Gauss curvature definition where the Gauss curvature value equals the product of both principal curvature values, the monoclastic surfaces correspond to zero Gauss curvature value, the synclastic surfaces correspond to positive Gauss curvature values, and the anticlastic surfaces to negative Gauss curvature values. The film structure comprises at least one film and may have a thickness ranging from one hundred nanometers to several tens or hundreds of micrometers. Thus, the film structure is flexible and supposed to conform to the optical surface of the vision base element. For cost reasons in the manufacture of the film structure, this film structure most often has initially a planar shape.

However, when the film structure is made to conform to the curved optical surface of the vision base element, stresses appear within the film structure and part of these stresses remain permanently after the film structure has been bonded to the vision base element. These stresses may be important, and cause wrinkles and delaminations to appear in the ophthalmic element so-obtained. The final product no longer meets quality requirements. Actually, the stresses are even more important when the optical surface of the vision base element is synclastic or anticlastic, which corresponds to most of situations in the ophthalmic field. Therefore, it is a major issue to reduce the stresses in a film structure that is to be adhered to a vision base element such as an eyeglass.

A first known method for reducing the occurrence of wrinkles and delaminations is to perform beforehand a preforming of the film structure. Nevertheless, because the film structure always has a residual elastic behavior, such preforming generates residual stresses within the film structure, which may cause wrinkles and delaminations to appear again once the film structure has been applied onto the curved surface of the vision base element or later in the lifetime of the product.

A second known method for reducing the stresses in the film structure consists in applying a heat treatment to the ophthalmic element after the film structure has been adhered to the vision base element. Such heat treatment is commonly called post-annealing and it is time-consuming and expensive. In addition, some heat treatments at high temperature may damage fragile compounds contained either in the film structure or in the vision base element. Moreover, it does not sufficiently suppress the stresses to ensure a long-term efficiency on product reliability.

A third known method as disclosed in FR 2 918 917 A1 consists in implementing bonding means between the film structure and the vision base element that allow relative shifts between these film structure and vision base element, parallel to the surface of the vision base element. But such bonding means are complex and expensive, and their implementation cause significant material waste.

Thus, there is still a need for new methods of manufacturing ophthalmic elements by applying a film structure onto a vision base element, in such a way as to ensure that no wrinkle and delamination appears.

Additional issues are that such methods are simple to implement and low-cost.

SUMMARY OF THE INVENTION

For meeting these objects or others, an aspect of the invention proposes a method for manufacturing an ophthalmic element comprising a vision base element and a film structure that is adhered permanently to a curved optical surface of the vision base element, so that the film structure conforms to this optical surface. The method comprises the following steps:

/1/ providing the film structure so that it has a useful area suitable for covering partially or entirely the optical surface of the vision base element, this film structure comprising at least one film having a sacrificial film portion that extends beyond the useful area from at least part of a peripheral limit of this useful area;

/2/ bonding the film structure to the optical surface of the vision base element, so that the peripheral limit of the useful area of the film structure matches a peripheral limit of the optical surface of the vision base element; then /3/ separating the sacrificial film portion from the useful area of the film structure, so that the film structure becomes limited to within the useful area in the ophthalmic element.

According to the invention, at least part of the sacrificial film portion is auxetic, so that a Poisson ratio ν of this part of the sacrificial film portion is negative. The Poisson ratio ν is defined as:

$$\nu = -\frac{\varepsilon_{trans}}{\varepsilon_{axial}}$$

wherein $\varepsilon_{trans}$ is a relative transverse strain of the auxetic part of the sacrificial film portion, and $\varepsilon_{axial}$ is a relative axial strain of the same auxetic part of the sacrificial film portion. These relative transverse strain and relative axial strain are positive for increases in transverse dimension and axial dimension, respectively, of the auxetic part of the sacrificial film portion, or negative for decreases in the transverse dimension and axial dimension, respectively, of the auxetic part of the sacrificial film portion.

Indeed, the inventors have observed that the sacrificial film portion contributes in a significant extent to the stresses that are produced in the film structure within the useful area, even if the sacrificial film portion is removed in step /3/. A reason for this is that in step /2/, the sacrificial film portion hinders the film structure to conform easily to the shape of the optical surface in the useful area, by producing increased stresses in this latter. Put another way, the sacrificial film portion prevents the film structure to shrink or stretch in the useful area when applied onto the vision base element. Then, once the film structure is adhered to the vision base element, such local shrinks or stretches of the film structure are no longer possible within the useful area. Using a sacrificial film portion that is auxetic, i.e. that has a negative Poisson ratio, allows that it exhibits a relative transverse strain $\varepsilon_{trans}$ and a relative axial strain $\varepsilon_{axial}$ that are both positive or both negative. This means that the sacrificial film portion can increase locally in both axial and a transverse dimensions. Thanks to such behavior, the sacrificial film portion produce much lower stresses in the film structure within its useful area when applied on the vision base element in step /2/. Then, no wrinkle or delamination appears within the useful area of the film structure, so that the mechanical and visual performances of the ophthalmic element are much improved. The invention method suits to implementations where the optical surface of the vision base element is curved, in particular synclastic or anticlastic, and when the film structure initially has a planar shape. Thus, the film structure may be planar in step /1/or before step /1/.

The vision base element which is submitted to step /2/of the invention method may be an eyeglass, either before or after this eyeglass has been trimmed at its peripheral edge according to a spectacle frame in which it is intended to be mounted. In case step /2/is performed using an untrimmed eyeglass, it is possible to perform step /3/so that the sacrificial film portion is separated from the useful area of the film structure during the same machining step as that of the eyeglass being trimmed at its edge.

Depending on invention implementations, it may not be necessary that the sacrificial film portion is auxetic in its entire area. An auxetic behavior that is limited to within a restricted part of the area of the sacrificial film portion may be sufficient or preferred. Possibly, part of the useful area of the film structure may also have an auxetic behavior, for instance near the periphery of the optical surface of the vision base element.

Moreover, the manufacture of the ophthalmic element remains simple and reduced in cost, since no preforming and/or stress-suppressing post-annealing may be necessary, and no complex bonding means are required. But heating of the film structure at least in the useful area may be implemented during step /1/ and/or /2/.

The sacrificial film portion may have several functions before step /3/. In particular, it may allow handling the film structure without damaging it within its useful area, and/or allow fixing the film structure onto a device designed for applying the film structure onto the optical surface of the vision base element in step /2/.

In possible implementations of the invention, the sacrificial film portion may extend all around the useful area of the film structure before step /3/. In this way, the sacrificial film portion allows the film structure to be hold all around the useful area in step /2/, such that application of the film structure onto the vision base element can be performed evenly within the whole useful area. This prevents certain zones of the useful area from being more prone to wrinkling and delaminating after the film structure has been adhered to the vision base element.

For such invention implementations, the auxetic part of the sacrificial film portion may surround the useful area of the film structure before step /3/. In this way, the stresses and strains that are generated by the sacrificial film portion in the useful area of the film structure can be reduced in the entirety of this useful area, such that wrinkles and delaminations are suppressed in the whole useful area.

Mathematically, the auxetic behavior of the sacrificial film portion allows having boundary conditions along the peripheral limit of the useful area which correspond to this limit being almost free to move. Such capability of almost-free movement for the film structure at the peripheral limit of the useful area reduces the stresses and strains, and also suppresses wrinkle occurrence within the useful area for the film structure.

Generally for the invention, before step /3/, the auxetic part of the sacrificial film portion may advantageously start from the peripheral limit of the useful area of the film structure and extend outwardly away from this useful area. This contributes to reducing as much as possible stresses generated next to the limit between the useful area and the sacrificial film portion.

Generally for the invention again, the auxetic part of the sacrificial film portion may be provided with a cut pattern. Thanks to such cut pattern, any material commonly used in the ophthalmic field can acquire an auxetic behavior. Such cut pattern may be formed by implementing one of the following processes:

- a mechanical cutting, using any cutting tool, in particular a die-cutting machine for instance;
- a laser cutting; and
- a ultrasonic cutting.

The cut pattern that confers the auxetic behavior to the sacrificial film portion can therefore be implemented by simple and inexpensive techniques. The ophthalmic element can be cheap and easy to manufacture as a result.

Also in invention implementations where the auxetic part of the sacrificial film portion is provided with a cut pattern, this cut pattern may be designed in the sacrificial film portion so as to reduce stresses and/or strains that appear in the useful area of the film structure in step /2/, once the film structure conforms to the optical surface of the vision base element in the useful area. The risk of remaining wrinkles and delaminations in the useful area of the film structure once the film structure and the vision base element are adhered to each other can be reduced in an improved extent in this way. In particular, the cut pattern may be designed using a computer-implemented finite-element method software. Thus, the mechanical behavior of the film structure within the ophthalmic element can be predicted by computer modeling and simulations. This allows predicting the ability to limit the stress transmission from the sacrificial film portion to the useful area for varied cut patterns in the sacrificial film portion film, without manufacturing film structures with the varied cut patterns.

Generally, the film that is auxetic in at least part of the sacrificial film portion may be made of a polymer-based material.

Also in preferred implementations of the invention, the peripheral limit of the optical surface of the vision base element may match a mounting outline of a frame in which the ophthalmic element is intended to be mounted. This allows reducing the useful area of the film structure, and therefore further reducing the stresses that may be generated therein in step /2/.

In various implementations of the invention, the film structure may be adapted to provide the ophthalmic element with at least one of the following functions within its useful area: an antireflecting function, an electrical conduction function, a solar-protection function, a photochromic function, an electrochromic function, a polarizing function, a function based on a holographic optical element, or a dioptric function, either passive or active dioptric function. However, it may be advantageous that such function does not exist in at least part of the sacrificial film portion, either for cost issue or because an arrangement necessary for this function within the film structure may hinder some use of the sacrificial film portion. The invention method is particularly advantageous for providing the curved optical surface of the vision base element with a hologram contained within the film structure. Indeed, it reduces a deformation that may affect the hologram when the film structure is applied onto the curved surface starting from a planar film structure shape.

Generally for the invention, the film structure may be multilayered and/or comprise cells which are juxtaposed next to one another parallel to the optical surface of the vision base element. The film structure can therefore provide the ophthalmic element with a great variety of functions, depending on the type and operation of the film structure.

Generally for the invention again, the ophthalmic element may form a spectacle lens, a helmet glass, a skiing mask, a diving mask, a goggle glass, an augmented reality device or a virtual reality device. The invention therefore provides a solution for a wide range of applications.

BRIEF DESCRIPTION OF THE DRAWINGS

Other features and advantages of the invention disclosed herein will become apparent from the following description of non-limiting embodiments, with reference to the appended drawings, in which:

FIG. 1A, FIG. 1B and FIG. 1C are schematic cross-sectional views that illustrate steps of a method according to the invention for manufacturing an ophthalmic element.

FIG. 2 is a schematic perspective view which corresponds to FIG. 1A, for an example of vision base element to be used in the ophthalmic element.

DETAILED DESCRIPTION OF SEVERAL EMBODIMENTS

Figure 3:
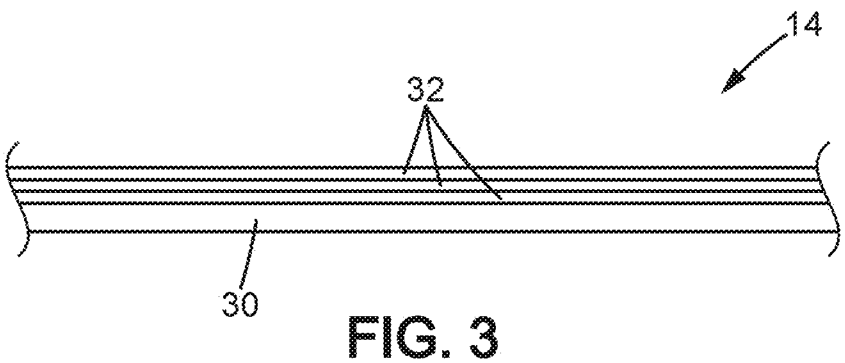
FIG. 3 is a schematic cross-sectional view of a first example of film structure which may be used in the method of FIG. 1A-FIG. 1C.

In these figures, elements represented do not correspond to actual dimensions or dimension ratios. In addition, same references indicated in several ones of the figures denote same elements.

FIG. 1A, FIG. 1B and FIG. 1C illustrate steps of a method according to the present invention for manufacturing an ophthalmic element 10. The ophthalmic element 10 comprises a vision base element 12 and a film structure 14 that is adhered to an optical surface of the vision base element, as it will be described later. The ophthalmic element 10 forms for example a spectacle lens, a helmet glass, a skiing mask, a diving mask or a goggle glass depending on the design and shape of the vision base element 12. The case of a spectacle lens will be used hereafter for illustration purpose. Also for illustrative purpose, the film structure is applied onto a convex surface of the vision base element in the detailed implementations of the invention which are described in detail hereafter, but it may be alternatively applied onto a concave surface of the vision base element.

The vision base element 12 comprises a front face 18 and a rear face 20, which are usually convex and concave respectively. The actual shapes of the front face 18 and rear face 20 depend on optical power and astigmatism values that are to be produced by the ophthalmic element 10. The vision base element 12 may be a semi-finished eyeglass with only the front face 18 being a final optical surface, or an eyeglass with both front face 18 and rear face 20 being final optical surfaces. In addition, a peripheral edge 22 of the vision base element 12 connects the front face 18 and rear face 20 to each other. The peripheral edge 22 may be circular for a semi-finished eyeglass, or may conform in size and shape to a mounting outline of a spectacle frame in which the ophthalmic element 10 being a spectacle lens is intended to be mounted. The peripheral edge 22 determines a peripheral limit 23 of the front face 18. For clarity sake, the following description will be limited to invention implementations where the film structure 14 is arranged on the convex front face 18, but other configurations may be contemplated as well. Therefore, the front face 18 constitutes the optical surface introduced in the general part of the present description.

As represented in FIG. 2, the front face 18 of the vision base element 12 has two curvatures $C_1$ and $C_2$ at any point P in this face. These curvatures $C_1$ and $C_2$ are defined respectively with respect to two directions $D_1$ and $D_2$ which are tangential to the front face 18 at point P and perpendicular to each other. In most cases, both curvatures $C_1$ and $C_2$ are non-zero and of one and same sign, i.e. corresponding to one and same curvature orientation. In such cases, the front face 18 is said to be a synclastic surface. However, using a film structure 14 as described below may also be implemented with a monoclastic or anticlastic optical surface of the vision base element 12.

The vision base element 12 may be of any optically transparent material that is commonly used in the ophthalmic field, in particular a polymer-based material.

The film structure 14 may comprise a single layer, but it may alternatively be multilayered as represented in FIG. 3. In such latter case, the film structure 14 comprises at least one support film 30 and at least one layer 32. For example, a plurality of layers 32 that are superposed on each other may have been deposited on the support film 30 using at least one thin film coating process. In particular, such multilayer configuration for the film structure 14 is appropriate for providing an antireflecting function or a solar protection function to the ophthalmic element 10, as non-limiting examples.

Figure 4:
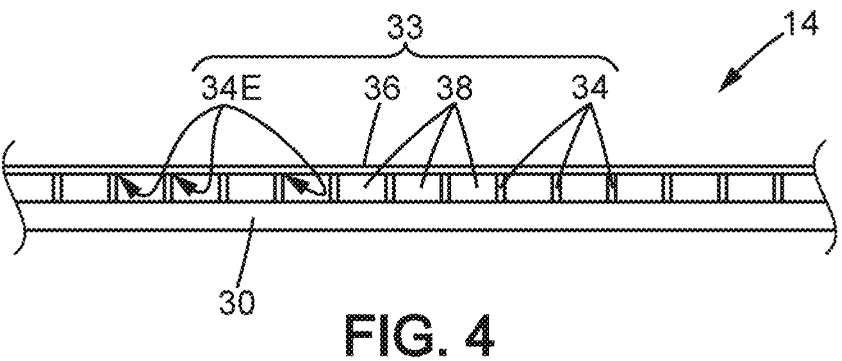
FIG. 4 is a schematic cross-sectional view of a second example of film structure which may be used in the method of FIG. 1A-FIG. 1C.

Alternatively, the film structure 14 may have a cellular structure as denoted by reference number 33 in FIG. 4. Then, it comprises again the support film 30, but this latter is provided with cell-separating walls 34 and a capping layer 36. The capping layer 36 seals the cells 38 at the top edges 34E of the cell-separating walls 34. In this way, the cells 38 are appropriate to contain permanently functionalization material portions. Such cellular film structure has been widely described in the literature, and suits for providing the ophthalmic element 10 with photochromic or electrochromic functions, for example.

The film structure 14 may also or alternatively comprise a refractive index gradient or any variation of refractive index.

In most of cases, the film structure 14 is initially planar as represented in FIG. 1A and FIG. 2. For this reason, hash signs that represent light reflections in FIG. 2 are drawn with curved dashed lines when they relate to the front face 18 of the vision base element 12 in backplane position, and with straight continuous lines when they relate to the film structure 14 in foreground position.

The film structure 14 has initially a total area greater than an area of the front face 18 of the vision base element 12 to which the film structure 14 is intended to be adhered. In this way, the film structure 14 comprises a useful area 24 suitable for covering entirely the front face 18 of the vision base element 12, and a sacrificial film portion 26. The useful area 24 has a peripheral limit 25 which matches the peripheral limit 23 of the front face 18, once the film structure 14 has been applied onto the front face 18. The sacrificial film portion 26 extends beyond the useful area 24: it extends from part of the peripheral limit 25 of the useful area 24, for example all around this peripheral limit 25. In the case the vision base element 12 is a semi-finished eyeglass, part of the sacrificial film portion 26 may be contained in the area of this semi-finished eyeglass outside of the peripheral limit 23 and can be removed later on during subsequent processing steps such as surfacing or edging. The sacrificial film portion 26 may be comprised of one or several constituting elements of the film structure 14, but it advantageously comprises a portion of the support film 30. Indeed, this support film 30 is likely to generate the most important stresses. The sacrificial film portion 26 is intended to be separated from the useful area 24 after the film structure 14 has been adhered to the vision base element 10. For this reason, when the film structure 14 is multilayered and/or has a cellular structure, the film structure 14 may be devoid of the layers 32 and/or the cellular structure 33 in at least part of the sacrificial film portion 26. This reduces the manufacturing cost of the film structure 14 while ensuring that it provides the ophthalmic element 10 with the desired function. For example, the layers 32 and/or the cellular structure 33 may be arranged within only a margin of the sacrificial film portion 26 adjacent to the peripheral limit 25 of the useful area 24, in addition to within this useful area 24. Alternatively, the layers 32 and/or the cellular structure 33 may be provided only within the useful area 24, the sacrificial film portion 26 being then comprised only of the support film 30.

The support film 30 has a thickness that usually ranges from one hundred nanometers to several tens or hundreds of micrometers, so that the film structure 14 is flexible. Advantageously, the film structure 14 is at least partially transparent for vision applications. Preferably, at least within the useful area 24, the film structure 14 is made of one or several optically transparent materials, in particular polymer-based materials, such as cellulose triacetate, also known as TAC, or polyethylene terephtalate, also known as PET, or cyclo-olefin polymers or copolymers, known also as COP or COC, or any other polymer-based material commonly used in the ophthalmic field. Optically transparent polymer-based materials used up to now have a positive Poisson ratio $\nu$. The Poisson ratio $\nu$ quantifies a response of a film along a transverse direction when a change in length is applied to the film along an axial direction. Both axial and transverse directions are perpendicular to each other and tangential to the film. The relative axial strain $\varepsilon_{axial}$ is $$\varepsilon_{axial} = \frac{A_f - A_0}{A_0},$$

where $A_0$ and $A_f$ are length values along the axial direction of an elementary film portion at a given point P, respectively when no stress is applied to this film portion and when a non-zero stress is applied. Similarly, the relative transverse strain $\varepsilon_{trans}$ is $$\varepsilon_{trans} = \frac{T_f - T_0}{T_0},$$

where $T_0$ and $T_f$ are length values along the transverse direction of the same elementary film portion at the same point P, respectively when no stress is applied to the film portion and when the non-zero stress is applied. The Poisson ratio $\nu$ is then $$\nu = -\frac{\varepsilon_{trans}}{\varepsilon_{axial}}.$$

Having a positive Poisson ratio means therefore that when the film structure 14 is stretched parallel to the axial direction, it simultaneously shrinks parallel to the transverse direction. Materials that behave in this way are known as non-auxetic materials.

At least a part 27 of the sacrificial film portion 26 is auxetic, i.e., the Poisson ratio $\nu$ in the part 27 is negative. The auxetic part 27 can therefore expand locally simultaneously along two directions which are perpendicular to each other and both tangential to the sacrificial film portion 26, at any point in its auxetic part 27. In the same way, it can also shrink simultaneously along both directions. In possible embodiments of the invention, the auxetic part 27 of the sacrificial film portion 26 surrounds the useful area 24 of the film structure 14. By "surround" it is meant that the auxetic part 27 extends around the entire useful area 24, but the auxetic part 27 may alternatively extend radially from only one portion or several portions of the useful area 24. The auxetic part 27 of the sacrificial film portion 26 may start from the peripheral limit 25 of the useful area 24 and extend outwardly away therefrom. Alternatively, the auxetic part 27 may start at a distance from the peripheral limit 25 of the useful area 24 and extend outwardly therefrom, within the sacrificial film portion 26. Possibly, the auxetic part 27 may include a portion thereof which extends within the useful area 24 of the film structure 14, for instance in a vicinity of the peripheral limit 25.

Figure 5A:
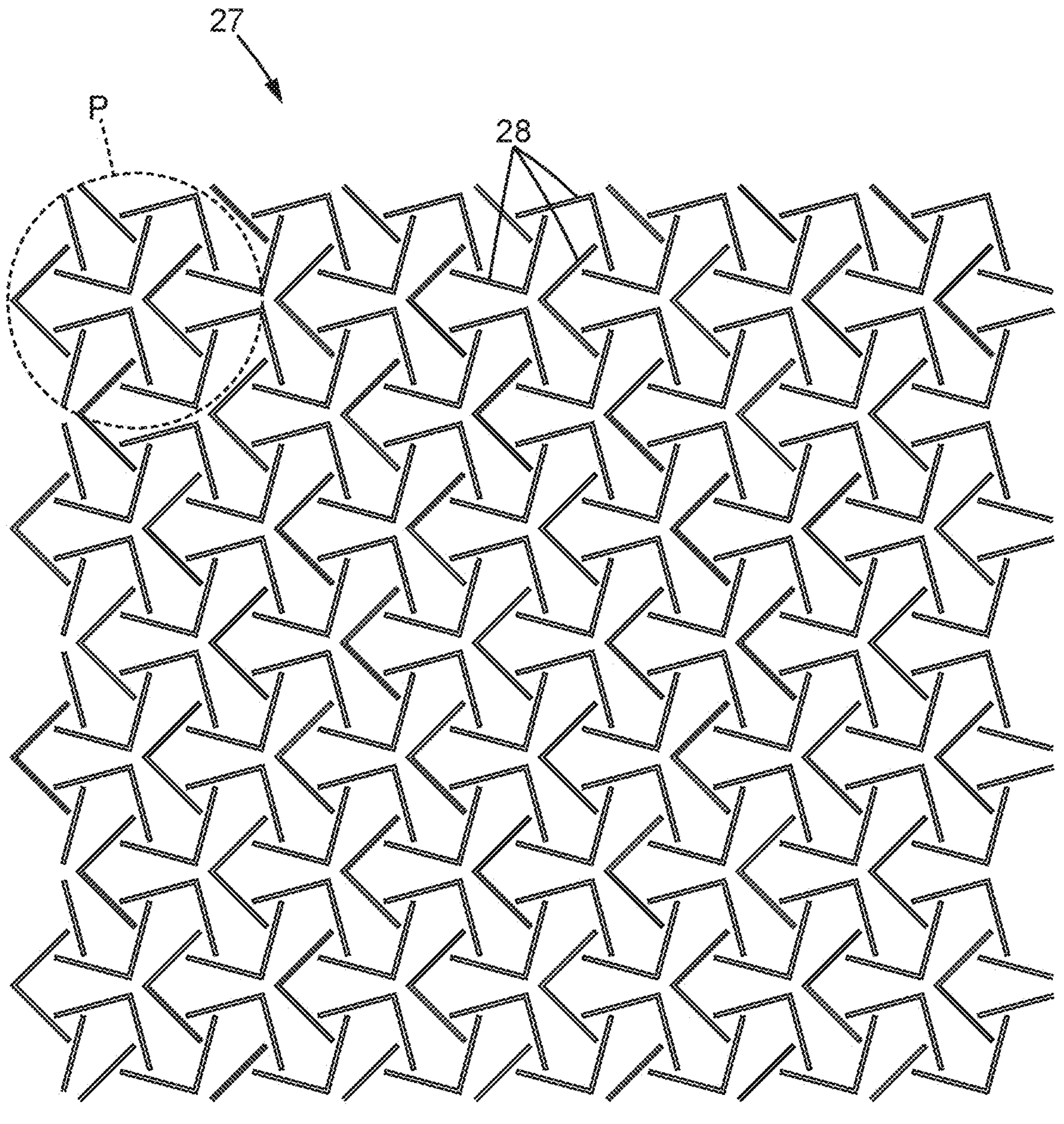
FIG. 5*a* is a plan view of a cut pattern which may be implemented in a sacrificial film portion used in accordance with the invention.
Figure 5B:
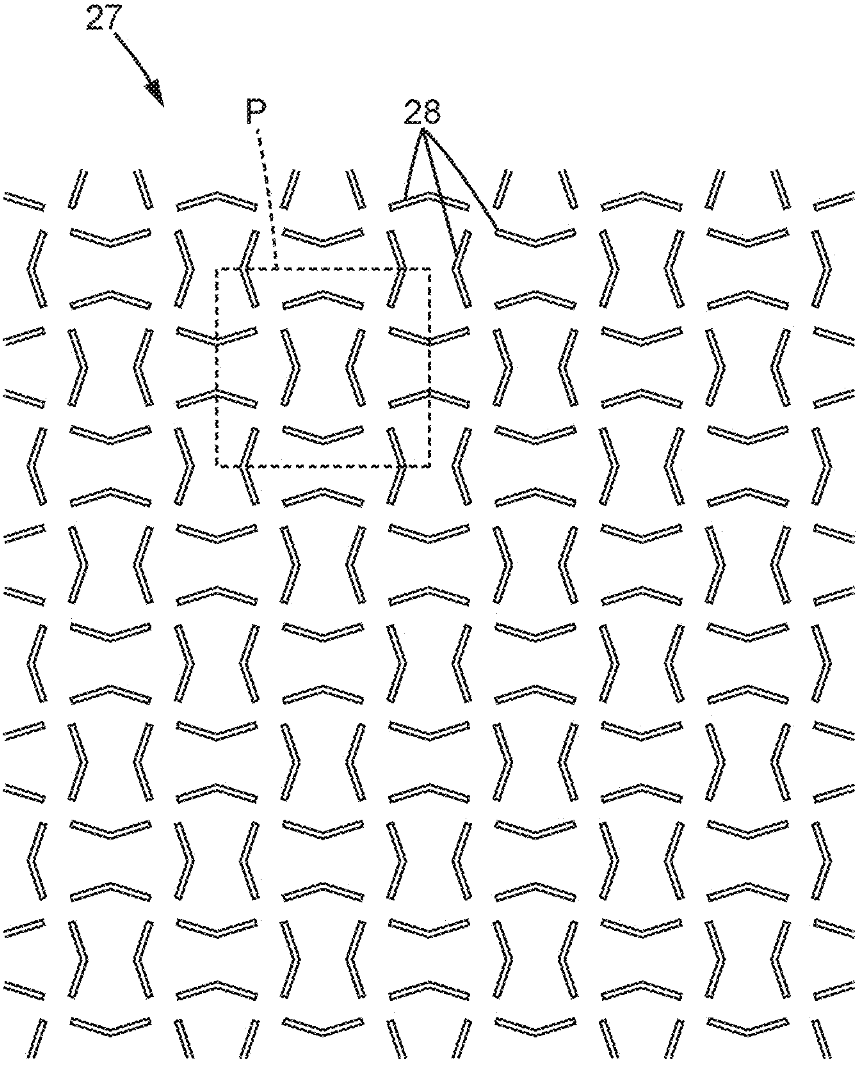
FIG. 5*b* corresponds to FIG. 5*a* for another cut pattern.

The support film 30 may be of a polymer-based material, provided that this material is optically transparent at least in part of the useful area 24. This material may be auxetic in nature. In this way, the sacrificial film portion 26 is auxetic ab initio. Alternatively, the support film 30 may be of a non-auxetic material, such as optically transparent polymer-based materials that are used up to now, and the auxetic behavior may be provided by a cut pattern 28 which extends across the thickness of the support film 30 in the part 27. The cut pattern 28 may be distributed all around the useful area 24, throughout the entire sacrificial film portion 26. Alternatively, the cut pattern 28 may be distributed all around the useful area 24 only in a ring-shaped band or a plurality of such bands within the sacrificial film portion 26 located at a given distance or given distances from the peripheral limit 25 and not occupying the entire area of the sacrificial film portion 26. In other possible invention embodiments, the cut pattern 28 may be provided only in a stripe or stripes of the sacrificial film portion 26 extending outwardly from the peripheral limit 25. The cut pattern 28 may also be provided only in the face of the sacrificial film portion 26 facing towards the vision base element 12, or in the other face away from the vision base element 12, or in both as schematically represented in FIG. 1A and FIG. 1B. Several such cut patterns are well known, and they can be produced at low cost in the sacrificial film portion 26 using one of the following processes: mechanical cutting including matrix stamping, laser cutting and ultrasonic cutting. The cut pattern 28 of the auxetic part 27 is designed so as to reduce stresses and strains that appear in the useful portion 24 once the film structure 14 has been made to conform to the front face 18 of the vision base element 12, as will be explained later. To this end, a computer-implemented finite-element method software may be used to design the cut pattern 28. FIG. 5*a* and FIG. 5*b* show two examples of cut patterns which may be implemented to provide the part 27 of the sacrificial film portion 26 with the auxetic behavior. In these figures, P denotes a base pattern which is repeated across the part 27 of the sacrificial film portion 26 for obtaining distributed auxetic behavior.

FIG. 1A represents a first step of the invention method. In this first step, the film structure 14 is provided and extends continuously from the useful area 24 into the sacrificial film portion 26. A pinching annular mechanism (not shown) holds the film structure 14 in position in front of the front face 18 of the vision base element 12 by at least part of the sacrificial film portion 26 at a distance from the useful area 24. At this stage, the film structure 14 has a substantially planar shape, while the front face 18 of the vision base element 12 is convex.

As shown in FIG. 1B, the vision base element 12 and the film structure 14 are brought close to each other, then forced against each other until the film structure 14 conforms to the front face 18 in its useful area 24, and then bonded to each other. Any displacement device and bonding means known in the art may be used. For example, a pressure-sensitive adhesive may be used to produce the bonding between the film structure 14 and the vision base element 12 in the useful area 24. During this bonding step, the film structure 14 and the vision base element 12 are located relative to each other so that the peripheral limit 25 of the useful area 24 of the film structure 14 is superposed to the peripheral limit 23 of the front face 18 of the vision base element 12. The sacrificial film portion 26 then extends beyond the front face 18, from the peripheral limit 25 of the useful area 24 all around this useful area 24. Once the vision base element 12 and the film structure 14 are bonded, the film structure 14 is definitively curved so as to conform to the front face 18. For bending the film structure 14 in the useful area 24, the sacrificial film portion 26 transmits stresses into the useful area 24 of the film structure 14, but a detrimental part of these stresses is significantly reduced by the auxetic behavior of the sacrificial film portion 26. In this way, wrinkles and delaminations that may result from the bending of the film structure 14 are suppressed.

Unlike prior bonding implementations, the sacrificial film portion 26 comprises the auxetic part 27 in the present invention. The cut pattern 28 of this auxetic part 27 is designed in the sacrificial film portion 26 so as to reduce the stresses that appear in the useful portion 24 once the film structure 14 conforms to the front face 18 of the vision base element 12. In particular, thanks to the auxetic behavior, the sacrificial film portion 26 can expand where necessary simultaneously along two directions which are perpendicular to each other and parallel to the sacrificial film portion 26. Similarly, it can shrink simultaneously along these two directions. This allows the film structure 30 to move parallel to the front face 18 in the useful area 24, relative to the vision base element 12 during the bonding step, thereby reducing stresses. Thus, providing at least one auxetic portion 27 in the sacrificial film portion 26 allows reducing the stresses within the remaining portion of the film structure 14 in the final ophthalmic element 10. The risk of occurrence of wrinkles and delaminations in the final product is therefore reduced or suppressed.

Once the useful area 24 of the film structure 14 and the optical surface 18 of the base element 12 have been bonded, the sacrificial film portion 26 is separated from the useful area 24. The portion of the film structure 14 that remains on the vision base element 12 is then limited to the useful area 24. The sacrificial film portion 26 may be separated by any known methods, such as cutting or trimming. The ophthalmic element 10 is therefore obtained as shown in FIG. 1C. It has mechanical and visual performances improved with respect to prior art since it is less likely that wrinkles and delaminations appear.

It will be appreciated that the implementation described above is illustrative of the invention disclosed herein, and that various modifications can be made while maintaining several of the advantages mentioned. In particular, the method for applying the film structure onto the vision base element may be changed, for example using pressure variations instead of a shifting device.

The invention claimed is:

1. A method for manufacturing an ophthalmic element comprising a vision base element and a film structure that is adhered permanently to a curved optical surface of the vision base element, so that the film structure conforms to said optical surface, the method comprising the following steps:

/1/ providing the film structure so that said film structure has a useful area suitable for covering partially or entirely the optical surface of the vision base element, and said film structure comprising at least one film having a sacrificial film portion that extends beyond the useful area from at least part of a peripheral limit of said useful area;

/2/ bonding the film structure to the optical surface of the vision base element, so that the peripheral limit of the useful area of the film structure matches a peripheral limit of the optical surface of the vision base element; then /3/ separating the sacrificial film portion from the useful area of the film structure, so that the film structure becomes limited to within the useful area in the ophthalmic element, wherein at least part of the sacrificial film portion is auxetic, so that a Poisson ratio ν of said part of the sacrificial film portion is negative, said Poisson ratio ν being defined as:

$$\nu = -\frac{\varepsilon_{trans}}{\varepsilon_{axial}}$$

wherein $\varepsilon_{trans}$ is a relative transverse strain of the auxetic part of the sacrificial film portion, and $\varepsilon_{axial}$ is a relative axial strain of the auxetic part of the sacrificial film portion, said relative transverse strain and relative axial strain being positive for increases in transverse dimension and axial dimension, respectively, of the auxetic part of the sacrificial film portion, or being negative for decreases in said transverse dimension and axial dimension, respectively, of the auxetic part of the sacrificial film portion.

2. The method according to claim 1, wherein the sacrificial film portion extends all around the useful area of the film structure before step /3/.

3. The method according to claim 2, wherein the auxetic part of the sacrificial film portion surrounds the useful area of the film structure before step /3/.

4. The method according to claim 1, wherein, before step /3/, the auxetic part of the sacrificial film portion starts from the peripheral limit of the useful area of the film structure and extends outwardly away from said useful area of the film structure.

5. The method according to claim 1, wherein the auxetic part of the sacrificial film portion is provided with a cut pattern.

6. The method according to claim 5, wherein the cut pattern of the auxetic part of the sacrificial film portion is formed by implementing one of the following processes:

a mechanical cutting;

a laser cutting; and a ultrasonic cutting.

7. The method according to claim 5, wherein the cut pattern is designed in the sacrificial film portion so as to reduce stresses and/or strains that appear in the useful area of the film structure in step /2/, once the film structure conforms to the optical surface of the vision base element in said useful area.

8. The method according to claim 7, wherein the cut pattern is designed using a computer-implemented finite-element method software.

9. The method according to claim 1, wherein the film that is auxetic in at least the part of the sacrificial film portion is made of a polymer-based material.

10. The method according to claim 1, wherein the peripheral limit of the optical surface of the vision base element matches a mounting outline of a frame in which the ophthalmic element is intended to be mounted.

11. The method according to claim 1, wherein the film structure is adapted to provide the ophthalmic element with at least one of the following functions within the useful area of said film structure: an antireflecting function, an electrical conduction function, a solar-protection function, a photochromic function, an electrochromic function, a polarizing function, a function based on a holographic optical element, or a dioptric function, either passive or active dioptric function.

12. The method according to claim 1, wherein the film structure is multilayered and/or comprises cells which are juxtaposed next to one another parallel to said film structure within the useful area.

13. The method according to claim 1, wherein the ophthalmic element forms a spectacle lens, a helmet glass, a skiing mask, a diving mask, a goggle glass, an augmented reality device or a virtual reality device.

14. The method according to claim 1, wherein the film structure is planar in step /1/ or before step /1/.

* * * * *